US010527164B2

(12) United States Patent
Terai

(10) Patent No.: US 10,527,164 B2
(45) Date of Patent: Jan. 7, 2020

(54) METHOD FOR CONTROLLING CONTINUOUSLY VARIABLE TRANSMISSION AND CONTINUOUSLY VARIABLE TRANSMISSION SYSTEM

(71) Applicant: NISSAN MOTOR CO., LTD., Yokohama-shi, Kanagawa (JP)

(72) Inventor: Hiromu Terai, Kanagawa (JP)

(73) Assignee: NISSAN MOTOR CO., LTD., Yokohama-shi (JP)

( * ) Notice: Subject to any disclaimer, the term of this patent is extended or adjusted under 35 U.S.C. 154(b) by 0 days.

(21) Appl. No.: 16/461,466

(22) PCT Filed: Nov. 24, 2016

(86) PCT No.: PCT/JP2016/084827
§ 371 (c)(1),
(2) Date: May 16, 2019

(87) PCT Pub. No.: WO2018/096622
PCT Pub. Date: May 31, 2018

(65) Prior Publication Data
US 2019/0346040 A1    Nov. 14, 2019

(51) Int. Cl.
*F16H 9/18*    (2006.01)
*F16H 61/12*    (2010.01)
*F16H 61/662*    (2006.01)
*F16H 61/00*    (2006.01)

(52) U.S. Cl.
CPC ............... *F16H 61/12* (2013.01); *F16H 9/18* (2013.01); *F16H 61/662* (2013.01); *F16H 61/0031* (2013.01); *F16H 2061/66286* (2013.01)

(58) Field of Classification Search
CPC ........ F16H 9/18; F16H 61/0031; F16H 61/12; F16H 61/662; F16H 2061/66286
See application file for complete search history.

(56) References Cited

U.S. PATENT DOCUMENTS

| | | | |
|---|---|---|---|
| 6,739,994 B1 | 5/2004 | Van Rooij et al. | |
| 2019/0195343 A1* | 6/2019 | Toyota | F16H 59/36 |
| 2019/0203833 A1* | 7/2019 | Toyota | F16H 9/18 |
| 2019/0203834 A1* | 7/2019 | Toyohara | F16H 9/18 |
| 2019/0257413 A1* | 8/2019 | Toyota | F16H 61/0031 |

FOREIGN PATENT DOCUMENTS

| | | |
|---|---|---|
| JP | 04-284155 A | 10/1992 |
| JP | 07-190157 A | 7/1995 |
| JP | 2002-523711 A | 7/2002 |
| JP | 2006-057757 A | 3/2006 |
| JP | 2011-052795 A | 3/2011 |
| JP | 2013-213557 A | 10/2013 |
| JP | 2015-135122 A | 7/2015 |

* cited by examiner

*Primary Examiner* — David R Morris
(74) *Attorney, Agent, or Firm* — Foley & Lardner LLP

(57) ABSTRACT

A method for controlling a continuously variable transmission is a control method of controlling in/out of oil to/from a primary oil chamber by using an oil pump provided in an oil passage between the primary oil chamber and a secondary oil chamber. The method includes: an abnormality determination step of determining whether rotation of the oil pump is abnormal; and when it is determined that the rotation is abnormal in the abnormality determination step, a hydraulic control step of making a secondary oil pressure higher than a pressure before the determination of abnormality.

7 Claims, 5 Drawing Sheets

METHOD FOR CONTROLLING CONTINUOUSLY VARIABLE TRANSMISSION AND CONTINUOUSLY VARIABLE TRANSMISSION SYSTEM

TECHNICAL FIELD

The present invention relates to a method for controlling a continuously variable transmission and a continuously variable transmission system.

BACKGROUND ART

There is disclosed a continuously variable transmission including a hydraulic circuit that includes a first oil pump configured to pump up oil from an oil pan to generate a line pressure and a second oil pump configured to be provided between a primary pulley and a secondary pulley to adjust the oil in/out to/from a primary oil chamber.

Japanese Publication of a Translation of an International Application 2002-523711 discloses that a shifting oil passage branched from a secondary oil passage for supplying line-pressure oil to a secondary pulley is provided and a second oil pump is provided in the shifting oil passage. The hydraulic circuit controls a speed ratio by adjusting the amounts of oil to be supplied to the primary pulley and the secondary pulley because the oil in/out to/from the primary oil chamber is adjusted by controlling the rotation direction of the second oil pump.

In such the continuously variable transmission, the second oil pump is driven by an electric motor. However, when a contamination etc. is mixed in oil, there is a possibility that the contamination is caught in a movable part of the oil pump and the rotation of the oil pump cannot be accurately controlled. When the rotation of the second oil pump cannot be controlled, the oil in/out to/from the primary pulley cannot be appropriately performed and a desired speed ratio cannot be realized. The catch of a contamination into the movable part of the oil pump becomes easy to occur along with the miniaturization of the recent oil pump.

An object of the present invention is to provide a method for controlling a continuously variable transmission and a continuously variable transmission system in which the possibility that the rotation of an oil pump cannot be accurately controlled is reduced.

SUMMARY OF INVENTION

According to one embodiment of the present invention, a method for controlling a continuously variable transmission is a control method of controlling in/out of oil to/from a primary oil chamber by using an oil pump provided in an oil passage between the primary oil chamber and a secondary oil chamber. The method includes: an abnormality determination step of determining whether rotation of the oil pump is abnormal; and when it is determined that the rotation is abnormal in the abnormality determination step, a hydraulic control step of making a secondary oil pressure higher than a pressure before the determination of abnormality.

DESCRIPTION OF EMBODIMENTS

Hereinafter, an exemplary embodiment of the present invention will be explained with reference to the accompanying drawings.

Figure 1:
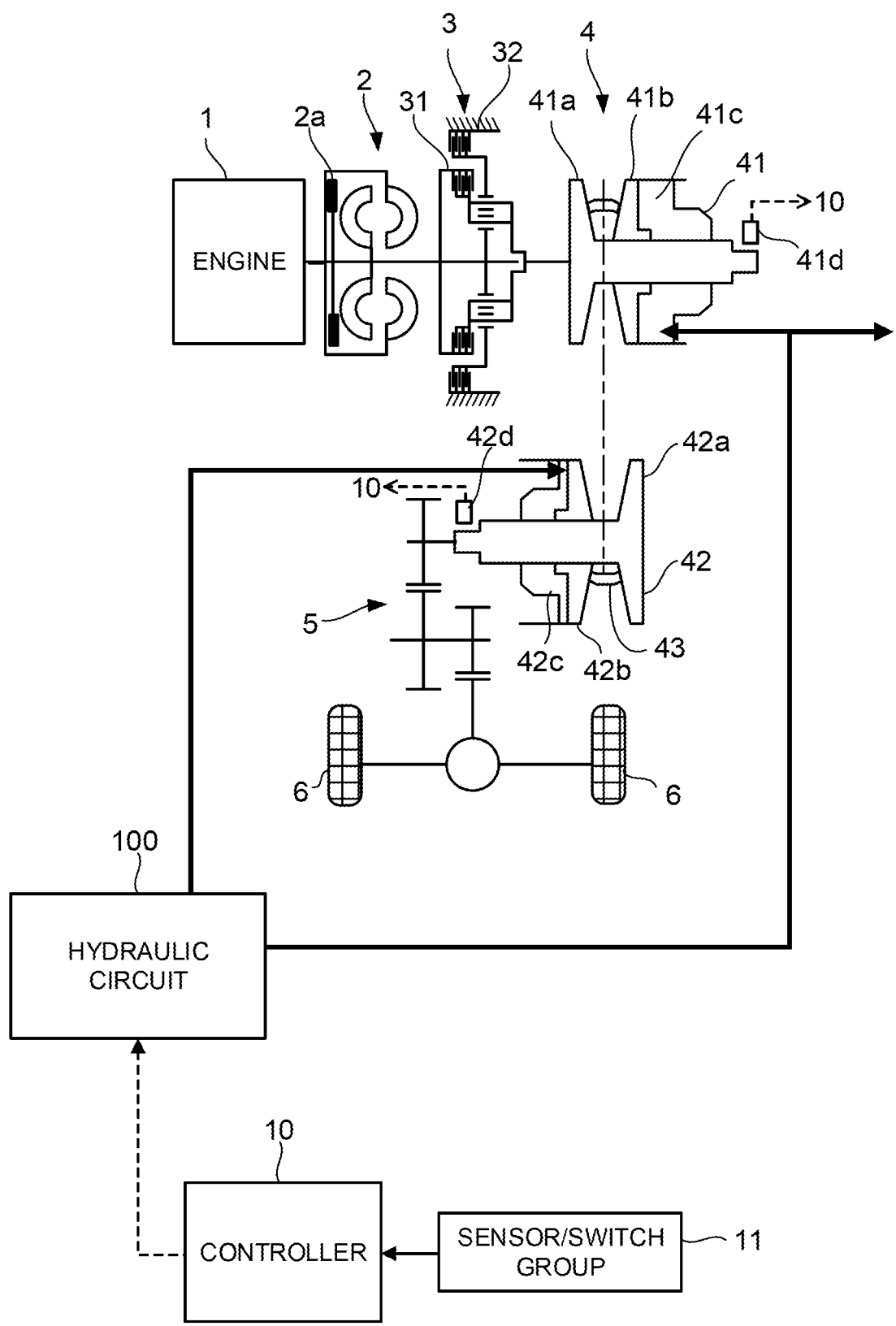
FIG. 1 is a schematic configuration diagram illustrating a vehicle.

FIG. 1 is a schematic configuration diagram illustrating a vehicle. The vehicle includes an engine 1, a torque converter 2 with a lock-up clutch 2a, a forward/reverse switching mechanism 3, a variator 4, a final reduction mechanism 5, driving wheels 6, and a hydraulic circuit 100.

The engine 1 constitutes the driving source of the vehicle. The output of the engine 1 is transmitted to the driving wheels 6 via the torque converter 2, the forward/reverse switching mechanism 3, the variator 4, and the final reduction mechanism 5. Therefore, the variator 4 is provided in a power transmission path for transmitting power from the engine 1 to the driving wheels 6, together with the torque converter 2, the forward/reverse switching mechanism 3, and the final reduction mechanism 5.

The forward/reverse switching mechanism 3 is provided between the torque converter 2 and the variator 4 in the above power transmission path. The forward/reverse switching mechanism 3 switches the rotation direction of the input rotation between a forward direction corresponding to forward travel and a reverse direction corresponding to reverse travel.

More specifically, the forward/reverse switching mechanism 3 includes a forward clutch 31 and a reverse brake 32. The forward clutch 31 is engaged when the rotation direction is a forward direction. The reverse brake 32 is engaged when the rotation direction is a reverse direction. The one of the forward clutch 31 and the reverse brake 32 can be configured as a clutch that intermits the rotation between the engine 1 and the variator 4.

The variator 4 includes a primary pulley 41, a secondary pulley 42, and a belt 43 wrapped around the primary pulley 41 and the secondary pulley 42. Hereinafter, primary is also referred to as "PRI" and secondary is also referred to as "SEC". The variator 4 constitutes a belt continuously variable transmission mechanism that changes the wrapping diameters of the belt 43 by changing the groove widths of the PRI pulley 41 and the SEC pulley 42 so as to perform the shift.

The PRI pulley 41 includes a fixed pulley 41a and a movable pulley 41b. A controller 10 activates the movable pulley 41b by controlling the amount of oil to be supplied to a PRI pulley hydraulic chamber 41c so as to change the groove width of the PRI pulley 41.

The SEC pulley 42 includes a fixed pulley 42a and a movable pulley 42b. The controller 10 activates the movable pulley 42b by controlling the amount of oil to be supplied to a SEC pulley hydraulic chamber 42c so as to change the groove width of the SEC pulley 42.

The belt 43 is wrapped around a sheave surface forming a V shape formed by the fixed pulley 41a and the movable pulley 41b of the PRI pulley 41 and a sheave surface forming a V shape formed by the fixed pulley 42a and the movable pulley 42b of the SEC pulley 42.

The final reduction mechanism 5 transmits the output rotation from the variator 4 to the driving wheels 6. The final reduction mechanism 5 is configured to include a plurality of gear trains and a differential gear. The final reduction mechanism 5 rotates the driving wheels 6 via an axle.

The hydraulic circuit 100 supplies an oil pressure to the variator 4, specifically, to the PRI pulley 41 and the SEC pulley 42. The hydraulic circuit 100 also supplies the oil pressure to the forward/reverse switching mechanism 3 and the lock-up clutch 2a, and further to a lubricating system and a cooling system that are not illustrated. The hydraulic circuit 100 is specifically configured as described below.

Figure 2:
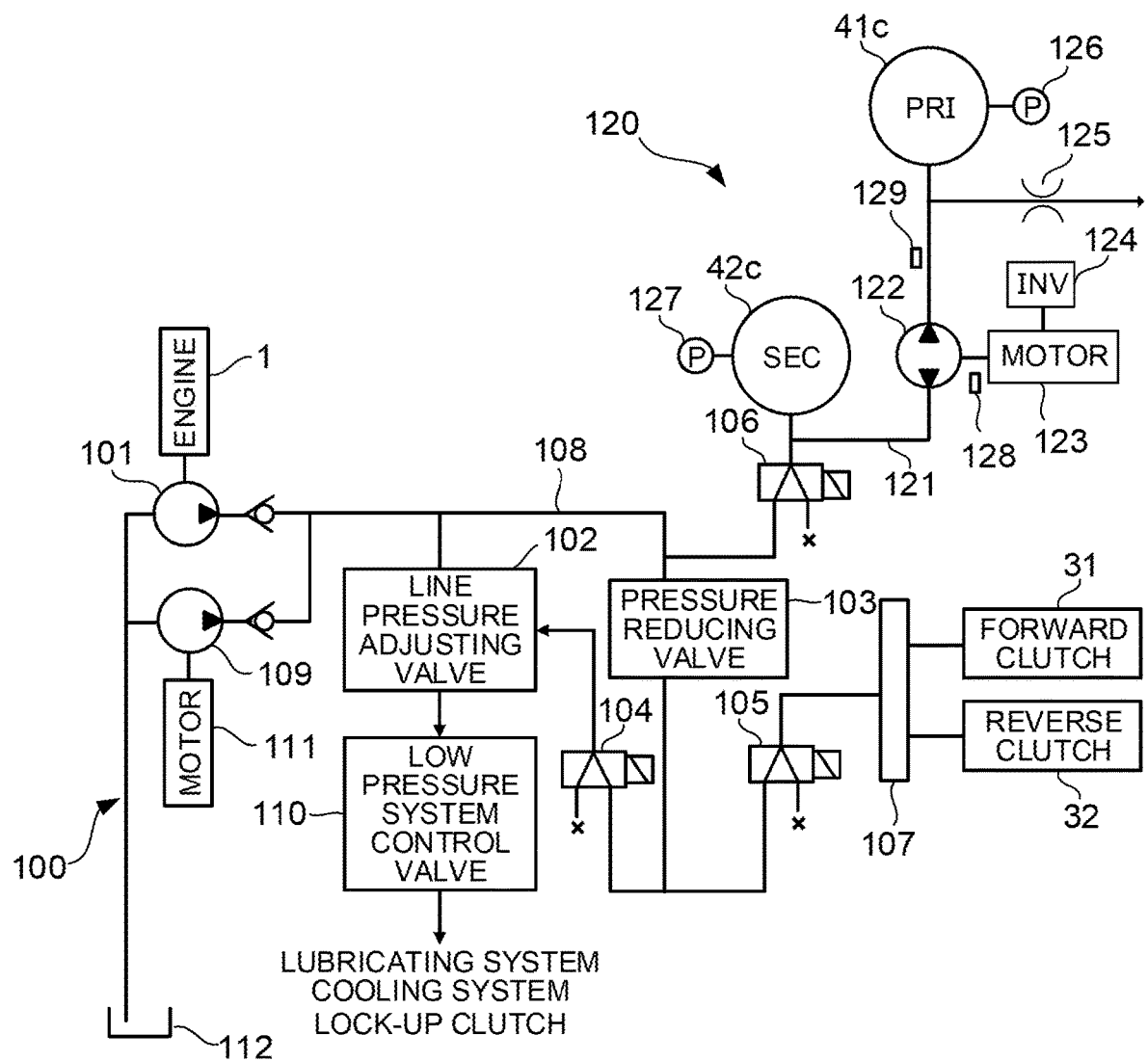
FIG. 2 is a schematic configuration diagram illustrating a hydraulic circuit.

FIG. 2 is a schematic configuration diagram illustrating the hydraulic circuit 100. The hydraulic circuit 100 includes an original pressure oil pump 101, a line pressure adjusting valve 102, a pressure reducing valve 103, a line pressure solenoid valve 104, a forward/reverse switching-mechanism solenoid valve 105, a shifting circuit pressure solenoid valve 106, a manual valve 107, a line pressure oil passage 108, a line-pressure electric oil pump 109, and a low pressure system control valve 110. Hereinafter, a solenoid valve is referred to as "SOL".

The original pressure oil pump 101 is a mechanical oil pump that is driven by the power of the engine 1. The original pressure oil pump 101 is connected to the line pressure adjusting valve 102, the pressure reducing valve 103, and the shifting circuit pressure SOL 106 via the line pressure oil passage 108. The line pressure oil passage 108 constitutes the oil passage for line pressure and is connected to a shift circuit 120 via the shifting circuit pressure SOL 106. In addition, a line pressure is an oil pressure acting as the original pressure of the PRI pressure and the SEC pressure.

The line-pressure electric oil pump 109 is driven by an electric motor 111. The line-pressure electric oil pump 109 is activated to supply a line pressure when the engine 1 is stopped by idling/stop control, for example, and the original pressure oil pump 101 is stopped along with this.

The line pressure adjusting valve 102 adjusts the oil pressure generated by the original pressure oil pump 101 to generate a line pressure. That the original pressure oil pump 101 generates the line pressure includes to generate a line pressure under such the action of the line pressure adjusting valve 102. The oil that the line pressure adjusting valve 102 releases during pressure adjustment is supplied to the lock-up clutch 2a, the lubricating system, and the cooling system via the low pressure system control valve 110.

The pressure reducing valve 103 decreases the line pressure. The oil pressure decreased by the pressure reducing valve 103 is supplied to the line pressure SOL 104 and the forward/reverse switching-mechanism SOL 105.

The line pressure SOL 104 is a linear solenoid valve to generate a control oil pressure according to a control current. The control oil pressure generated by the line pressure SOL 104 is supplied to the line pressure adjusting valve 102, and the line pressure adjusting valve 102 operates in accordance with the control oil pressure generated by the line pressure SOL 104 to perform pressure adjustment. For this reason, the command value of a line pressure PL can be set by the control current to the line pressure SOL 104.

The forward/reverse switching-mechanism SOL 105 is a linear solenoid valve to generate an oil pressure according to a control current. The oil pressure generated by the forward/reverse switching-mechanism SOL 105 is supplied to the forward clutch 31 and the reverse brake 32 via the manual valve 107 activated according to the operation of a driver.

The shifting circuit pressure SOL 106 is a linear solenoid valve to generate an oil pressure to be supplied to the shift circuit 120 in accordance with a control current. For this reason, the command value of a shifting circuit pressure can be set by the control current to the shifting circuit pressure SOL 106. The shifting circuit pressure generated by the shifting circuit pressure SOL 106 is supplied to a shifting oil passage 121 of the shift circuit 120. For example, the shifting circuit pressure may be generated by SOL that generates a control oil pressure according to a control current and a pressure control valve that generates a control circuit pressure from the line pressure PL in accordance with the control oil pressure generated by this SOL.

The shift circuit 120 includes the shifting oil passage 121 connected to the line pressure oil passage 108 via the shifting circuit pressure SOL 106 and a shift oil pump 122 interposed in the shifting oil passage 121. The shifting oil passage 121 communicates the PRI pulley hydraulic chamber 41c with the SEC pulley hydraulic chamber 42c.

The shift oil pump 122 is an electrically operated oil pump that is driven by an electric motor 123. The electric motor 123 is controlled by the controller 10 via an inverter 124. The shift oil pump 122 can switch the rotation direction between forward and reverse directions. Herein, the forward direction is a direction to send oil from the SEC pulley hydraulic chamber 42c side to the PRI pulley hydraulic chamber 41c side and the reverse direction is a direction to send oil from the PRI pulley hydraulic chamber 41c side to the SEC pulley hydraulic chamber 42c side.

When the shift oil pump 122 rotates in the forward direction, oil in the shifting oil passage 121 is supplied to the PRI pulley hydraulic chamber 41c. As a result, the movable pulley 41b of the PRI pulley 41 moves in a direction approaching the fixed pulley 41a, and thus the groove width of the PRI pulley 41 is decreased. On the other hand, the movable pulley 42b of the SEC pulley 42 moves in a direction away from the fixed pulley 42a, and thus the groove width of the SEC pulley 42 is increased. In addition, when the shift oil pump 122 rotates in the forward direction, oil is supplied from the line pressure oil passage 108 to the shifting oil passage 121 so that the oil pressure (hereinafter, also referred to as "SEC-side oil pressure") of the shifting oil passage 121 closer to the SEC pulley hydraulic chamber 42c (hereinafter, also referred to as "SEC side") than the shift oil pump 122 does not fall below the command value of the shifting circuit pressure. The command value of the shifting circuit pressure is set in consideration of preventing the slip of the belt 43, for example. In addition, the oil pressure of the shifting oil passage 121 closer to the PRI pulley hydraulic chamber 41c (hereinafter, also referred to as "PRI side") than the shift oil pump 122 is also referred to as a PRI-side oil pressure.

When the shift oil pump 122 rotates in the reverse direction, oil flows out from the PRI pulley hydraulic chamber 41c. As a result, the movable pulley 41b of the PRI pulley 41 moves in a direction away from the fixed pulley 41a, and thus the groove width of the PRI pulley 41 is increased. On the other hand, the movable pulley 42b of the SEC pulley 42 moves in a direction approaching the fixed pulley 42a, and thus the groove width of the SEC pulley 42 is decreased. Because the oil flowing out from the PRI pulley hydraulic chamber 41c flows into the SEC side, the SEC-side oil pressure is raised. However, the SEC-side oil pressure is controlled not to exceed the command value by the shifting circuit pressure SOL 106. In other words, when the SEC-side oil pressure exceeds the command value, oil is discharged from the shifting oil passage 121 via the shifting circuit pressure SOL 106. On the other hand, when the SEC-side oil pressure is less than the command value, oil flows into from the line pressure oil passage 108 via the shifting circuit pressure SOL 106.

As above, the continuously variable transmission according to the present embodiment performs the shift by controlling the oil in/out to/from the PRI pulley hydraulic chamber 41*c* by using the shift oil pump 122. The brief of the shift control will be described below.

A branching path branching from between the shift oil pump 122 and the PRI pulley hydraulic chamber 41*c* is provided in the shifting oil passage 121. Herein, an orifice 125 is provided in the branching path. Oil can be discharged from the orifice 125 to the outside of the shifting oil passage 121. More specifically, the orifice 125 is formed so that its diameter becomes smaller in a portion of the oil passage, and the opposite end of the branching point in the shifting oil passage 121 is opened. Oil continues always leaking out from this open end. When oil is supplied to the PRI pulley hydraulic chamber 41*c* by the shift oil pump 122, some of oil leaks out from the orifice 125. The oil discharged outside of the shifting oil passage 121 from the orifice is discharged into a space in a case of the continuously variable transmission and is collected in an oil pan 112. As described above, the outside (the tip of the orifice 125) of the shifting oil passage 121 according to the present embodiment is a space. However, the outside (the tip of the orifice 125) of the shifting oil passage 121 may be an oil passage having an oil pressure lower than that of the shifting oil passage 121. In other words, the outside of the shifting oil passage 121 only needs to be a place at which an oil pressure is lower than that of the shifting oil passage 121. In addition, the orifice 125 is an example of an oil discharge mechanism.

Referring again to FIG. 1, the vehicle further includes the controller 10. The controller 10 is an electronic control device and receives signals from a sensor/switch group 11. In addition, the controller 10 is configured by a microcomputer that includes a central processing unit (CPU), a read-only memory (ROM), a random-access memory (RAM), and an input-output interface (I/O interface). The controller 10 may be configured by a plurality of microcomputers.

For example, the sensor/switch group 11 includes an accelerator pedal opening sensor that detects the accelerator pedal opening of the vehicle, a brake sensor that detects the brake pedal force of the vehicle, a vehicle speed sensor that detects a vehicle speed Vsp, and an engine rotation speed sensor that detects a rotation speed NE of the engine 1.

As illustrated in FIG. 2, the sensor/switch group 11 includes a PRI pressure sensor 126 that detects a PRI pressure, a SEC pressure sensor 127 that detects a SEC pressure, a pump rotation speed sensor 128 that detects the rotation speed of the shift oil pump 122, and an oil temperature sensor 129 that detects the temperature of the oil in the shifting oil passage 121. The signals from the sensor/switch group 11 may be input into the controller 10 via another controller, for example. The same is applied to the signals such as information generated by the other controller based on the signals from the sensor/switch group 11.

The controller 10 controls the hydraulic circuit 100 based on the signals from the sensor/switch group 11. More specifically, the controller 10 controls the line pressure SOL 104 and the shift circuit 120 illustrated in FIG. 2. Furthermore, the controller 10 is configured to control the forward/reverse switching-mechanism SOL 105 and the shifting circuit pressure SOL 106.

In controlling the line pressure SOL 104, the controller 10 supplies the control current according to the command value of the line pressure PL to the line pressure SOL 104.

In executing the shift control, the controller 10 sets a target speed ratio based on the signals from the sensor/switch group 11. If the target speed ratio is determined, wrapping diameters (target wrapping diameters) of the pulleys 41 and 42 for realizing the target speed ratio are determined. If the target wrapping diameters are determined, groove widths (target groove widths) of the pulleys 41 and 42 for realizing the target wrapping diameters are determined.

Moreover, in the shift circuit 120, the movable pulley 41*b* of the PRI pulley 41 moves in accordance with the oil in/out to/from the PRI pulley hydraulic chamber 41*c* by the shift oil pump 122, and the movable pulley 42*b* of the SEC pulley 42 also moves according to this. That is to say, the movement amount of the movable pulley 41*b* of the PRI pulley 41 correlates with the movement amount of the movable pulley 42*b* of the SEC pulley 42.

Therefore, the controller 10 activates the shift oil pump 122 so that the position of the movable pulley 41*b* of the PRI pulley 41 becomes a position corresponding to the target speed ratio. The determination of whether the movable pulley 41*b* is located at a desired position is performed by calculating an actual speed ratio from the detected values of a PRI rotation speed sensor 41*d* and a SEC rotation speed sensor 42*d* and determining whether this actual speed ratio is identical with the target speed ratio.

Moreover, that the controller 10 activates the shift oil pump 122 is not limited to the shifting time. Even when the target speed ratio is not changed, the controller 10 activates the shift oil pump 122 when oil leaks out from each of the pulley hydraulic chambers 41*c* and 42*c* so as to change the actual speed ratio. In the present embodiment, such the control to maintain the target speed ratio is also included in the shift control.

In other words, the shift control according to the present embodiment is a feedback control for converging the position of the movable pulley 41*b* of the PRI pulley 41 on a target position. Herein, the control target of this feedback control is not the oil pressures of the pulley hydraulic chambers 41*c* and 42*c* but is the groove width of the PRI pulley 41, i.e., the position of the movable pulley 41*b*.

In addition, a sensor that detects the position of the movable pulley 41*b* is provided, and this sensor may determine whether the movable pulley 41*b* is located at a position corresponding to the target speed ratio.

Herein, in the present embodiment, in the PRI pulley 41, a piston moves in a cylinder to change a speed ratio by controlling an oil flow rate to be introduced. The oil in/out to/from the PRI pulley 41 is performed by the shift oil pump 122.

However, when impurity such as a contamination is mixed in oil, a contamination may be caught in the movable part of the shift oil pump 122. In this case, because the shift oil pump 122 is not appropriately rotated, there is a possibility that the oil in/out to/from the PRI pulley 41 cannot be controlled and the speed ratio cannot be adjusted. Therefore, in the present embodiment, because the contamination caught in the movable part of the shift oil pump 122 can be removed by performing the following hydraulic control, the shift failure can be reduced.

More specifically, in the hydraulic control, in a state where power is not supplied to the shift oil pump 122, the SEC pressure is set to a pressure higher than a pressure before the shift failure occurs by controlling the original pressure oil pump 101, the line pressure adjusting valve 102, etc. By doing so, because oil is forced to flow into the shift oil pump 122, the caught contamination is removed and thus the clogging of the shift oil pump 122 is eliminated.

When the lock of the shift oil pump 122 is released, oil is released from the closed space and the PRI pressure becomes equal to the SEC pressure. For that reason, when a cross-sectional area of the PRI pulley 41 is smaller than a cross-sectional area of the SEC pulley 42, a thrust (PRI thrust) in the PRI pulley 41 becomes smaller than a thrust (SEC thrust) in the SEC pulley 42 and thus the speed ratio becomes small (Low) so as to perform unintentional shift. Therefore, in the present embodiment, it is possible to prevent the speed ratio from being unintentionally changed to Low by performing the hydraulic control when the speed ratio is the smallest (Low). Moreover, even when the speed ratio becomes high (High), because the driver is hard to notice the change of the speed ratio if the speed ratio is small comparatively, it is possible to suppress the decrease in drivability.

Figure 3:
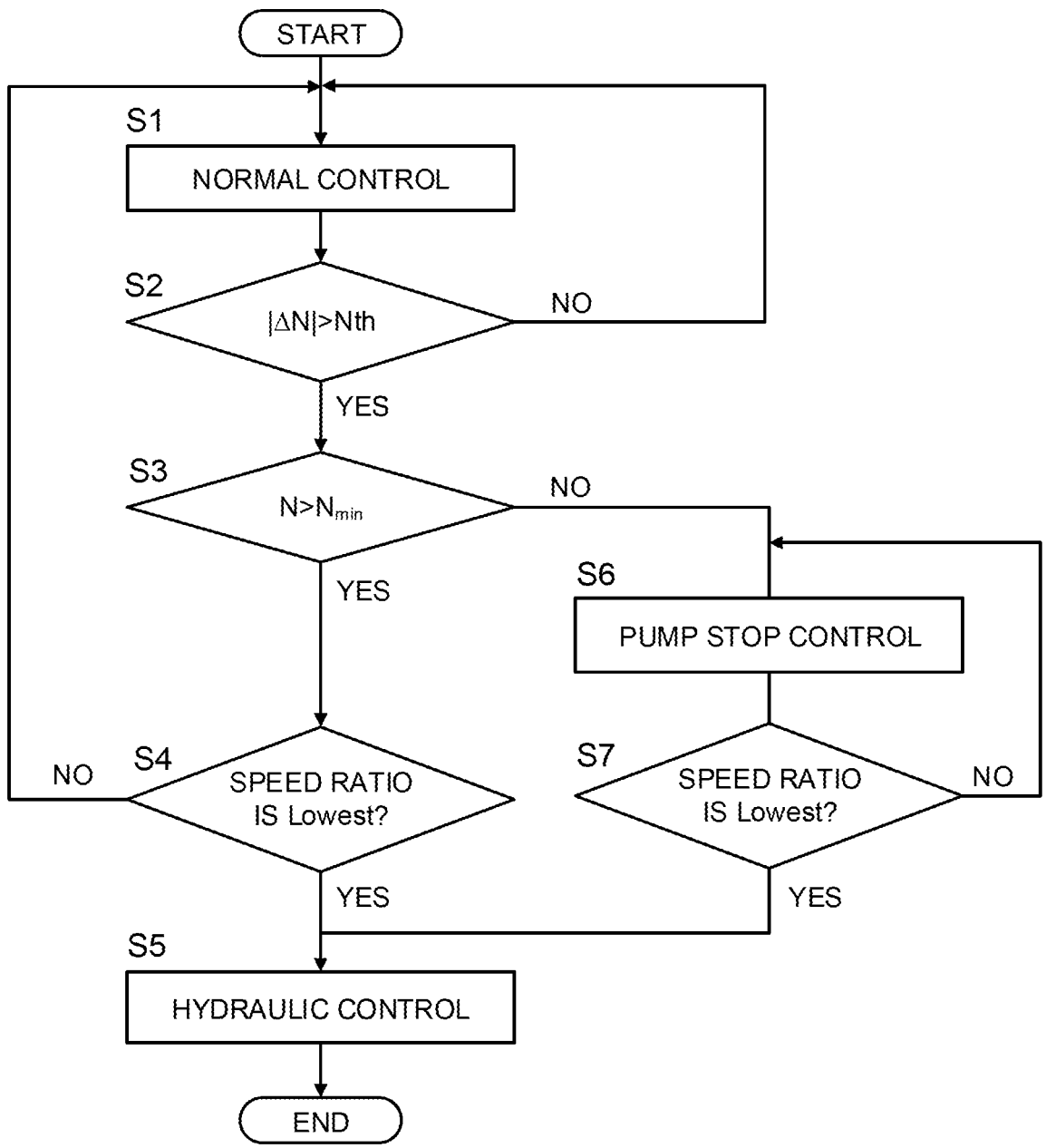
FIG. 3 is a flowchart illustrating a clogging elimination control.

FIG. 3 is a flowchart illustrating a clogging elimination control for eliminating the clogging of the shift oil pump 122 by the hydraulic control. This control is repeatedly performed at intervals of several milliseconds, for example.

In Step S1, the controller 10 executes a normal control to control a SEC pressure so that belt slip does not occur in the SEC pulley 42. In addition, the control of the SEC pressure is performed by decreasing a line pressure to a target SEC pressure by using the shifting circuit pressure SOL 106. Then, the process proceeds to Step S2.

In Step S2, the controller 10 executes an abnormality determination step to determine whether the rotation of the shift oil pump 122 is abnormal or not. When acquiring a rotation speed N of the shift oil pump 122, the controller 10 calculates a deviation $\Delta N$ between the rotation speed N of the shift oil pump 122 and a command value N* of a rotation speed for the electric motor 123. Then, the controller 10 determines whether the absolute value of the deviation $\Delta N$ exceeds a predetermined threshold Nth that is an allowable upper limit. It should be noted that an allowable upper limit is a value larger than the absolute value of a deviation occurring in controlling the rotation speed of the shift oil pump 122 (position feedback control) in normal times. Herein, the deviation occurring in controlling the rotation speed of the shift oil pump 122 in normal times indicates a deviation between an actual rotation speed and a command value caused by response delay, a deviation between an actual rotation speed and a command value caused by oil pressure fluctuation etc., and the like.

When the absolute value of the deviation $\Delta N$ exceeds the threshold Nth (S2: Yes), the controller 10 determines that the shift oil pump 122 is not normally controlled and abnormality such as clogging occurs, and proceeds to the process of Step S3. When the absolute value of the deviation $\Delta N$ is equal to or less than the threshold Nth (S2: No), the controller 10 determines that the abnormality such as clogging does not occur in the shift oil pump 122 and returns to the process of Step S1.

In Step S3, the controller 10 executes a rotation stop determination step. The controller 10 determines whether the rotation speed N of the shift oil pump 122 exceeds a predetermined lower-limit rotation speed N min. Herein, it is preferable that the lower-limit rotation speed N min is a value close to zero and is a value having a margin of not allowing erroneous determination.

When the rotation speed N exceeds the lower-limit rotation speed N min (S3: Yes), the controller 10 determines that the shift oil pump 122 is not in a rotation stop state where it is locked and proceeds to the process of Step S4. On the other hand, when the rotation speed N is equal to or less than the lower-limit rotation speed N min (S3: No), the controller 10 determines that the shift oil pump 122 is locked and proceeds to the process of Step S5.

In Step S4, the controller 10 executes a determination step of whether to execute the hydraulic control. The controller 10 determines whether the speed ratio is the lower limit (Lowest) of a settable shift range. Then, when the speed ratio is Lowest (S4: Yes), the controller 10 proceeds to the process of Step S5 to execute the hydraulic control. On the other hand, when the speed ratio is not Lowest (S4: No), the controller 10 proceeds to the process of Step S1 without performing the hydraulic control.

In Step S5, the controller 10 executes the hydraulic control. More specifically, the controller 10 cuts off the power supply to the shift oil pump 122 and makes a state where the shift oil pump 122 can freely rotate. Then, the controller 10 controls the shifting circuit pressure SOL 106 to make the reduction amount of the line pressure smaller and thus causes the SEC pressure to be higher than that of the case where the normal control is performed before the occurrence of abnormality. By doing like this, because oil is forced to flow into the shift oil pump 122, the contamination caught in the shift oil pump 122 is removed. In this way, the clogging of the shift oil pump 122 is eliminated.

In Step S6, the controller 10 executes a pump stop control and cuts off the power supply to the shift oil pump 122 to make a state where the shift oil pump 122 can freely rotate. In addition, the controller 10 continues the normal control of the original pressure oil pump 101. Then, the controller proceeds to the process of Step S7.

In Step S7, similarly to Step S4, the controller 10 executes the determination step of whether to execute the hydraulic control. When the speed ratio is Lowest (S7: Yes), the controller 10 proceeds to the process of Step S5 to execute the hydraulic control. On the other hand, when the speed ratio is not Lowest (S7: No), the controller 10 proceeds to the process of Step S6 without executing the hydraulic control.

Herein, when the shift oil pump 122 is not locked (S3: No), the speed ratio transits to Lowest (S7: Yes) with the passage of time and the hydraulic control can be executed if the shift oil pump can freely rotate (S6). The reason for this is as follows.

Figure 4:
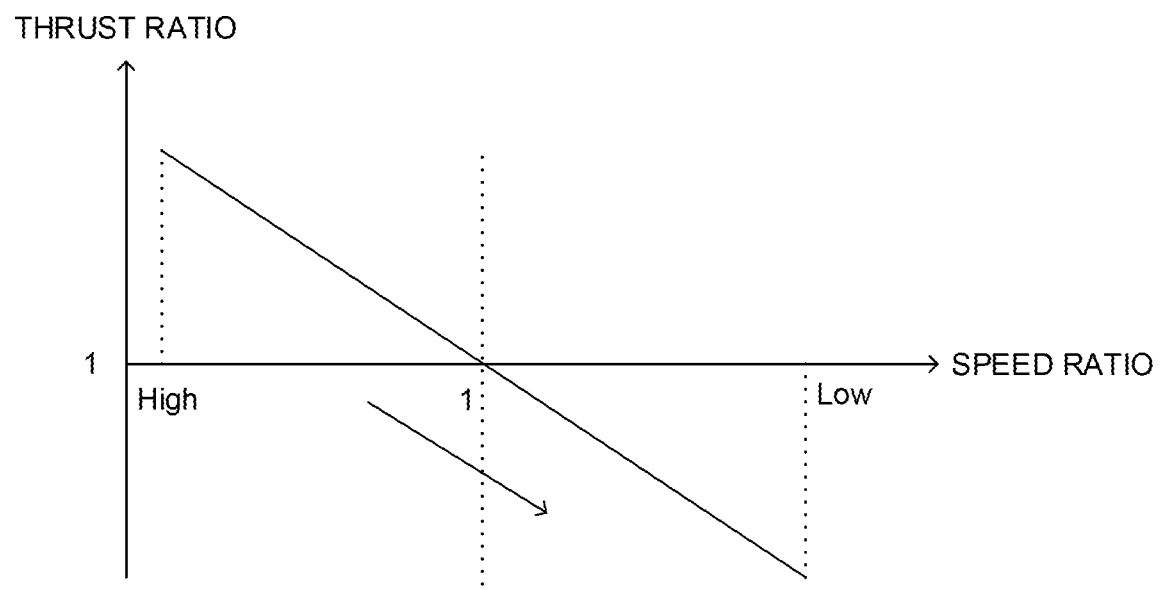
FIG. 4 is a graph illustrating a relationship between a thrust ratio and a speed ratio.

FIG. 4 illustrates a relationship between a thrust ratio and a speed ratio. Herein, the thrust ratio means PRI thrust/SEC thrust, namely (PRI pressure×PRI area)/(SEC pressure×SEC area). Because the piston of the PRI pulley 41 moves toward High when the PRI pressure is increased, the speed ratio becomes high. On the other hand, because the piston position of the PRI pulley 41 moves toward Low when the PRI pressure is decreased, the speed ratio becomes small. Moreover, when the thrust ratio is 1, namely the PRI pressure is equal to the SEC pressure, the speed ratio becomes 1.

In the present embodiment, the continuously variable transmission is configured so that the cross-sectional area of the piston part of the PRI pulley 41 is smaller than the cross-sectional area of the piston part of the SEC pulley 42. Herein, if the shift oil pump 122 can freely rotate, the PRI pressure becomes equal to the SEC pressure. Because a thrust of each of the pulleys is a product of a pressure and a cross-sectional area, a thrust of the PRI pulley 41 having a small cross-sectional area becomes smaller than a thrust of the SEC pulley 42.

Therefore, when the shift oil pump 122 is not locked (S3: No) and can freely rotate (S6), the thrust of the PRI pulley 41 is lower than the thrust of the SEC pulley 42. For that reason, as illustrated by an arrow in FIG. 4, the speed ratio transits to Lowest because the piston position moves toward Low. Therefore, even if the speed ratio is not Lowest (S7: No), the speed ratio transits to Lowest while continuing the process of Step S6.

Moreover, in the present embodiment, the orifice 125 as a leak circuit is provided between the PRI pulley 41 and the shift oil pump 122 in a PRI circuit communicating with the PRI pulley 41.

To maintain a predetermined speed ratio, the piston position of the PRI pulley 41 must be constant. That the piston position is constant means that the volume of a PRI piston chamber is constant. The volume of the PRI circuit between the piston part of the PRI pulley 41 and the shift oil pump 122 is constant naturally. For that reason, there is limited the volume of a space into which oil flowing into the shifting oil passage 121 via the shifting circuit pressure SOL 106 flows after passing through the shift oil pump 122. For that reason, oil is leaking out to some extent in the shift oil pump 122, the PRI pulley 41, etc., but the inflow amount of oil may exceed the leak amount in the PRI circuit when oil flows into the PRI circuit by increasing the SEC pressure. When the inflow amount of oil exceeds the leak amount, the speed ratio cannot be maintained. For that reason, it is necessary to satisfy the following expression.

Discharge amount of original pressure oil pump 101<Leak amount of PRI circuit (1)

Moreover, the original pressure oil pump 101 has the characteristics such as the following expression.

Discharge amount=Specific discharge amount×Rotation speed (2)

Herein, substituting Expression (2) into Expression (1) obtains the following.

Rotation speed of Original pressure oil pump 101<Leak amount of PRI circuit/Specific discharge amount of Original pressure oil pump 101 (3)

In other words, the original pressure oil pump 101 requires to be controlled to satisfy Expression (3).

However, to remove a contamination caught in the shift oil pump 122, it is necessary to sufficiently increase the rotation speed of the original pressure oil pump 101. Therefore, in the present embodiment, because the orifice 125 as a discharge mechanism is provided, the right side is increased in Expression (3) due to the increase in the leak amount of the PRI circuit. For that reason, because the upper limit of the rotation speed of the original pressure oil pump 101 can be increased, it can be made easy to eliminate the clogging of the shift oil pump 122.

In addition, in the present embodiment, the controller 10 performs the control illustrated in FIG. 3, but the present embodiment is not limited to the above. The controller 10 may include blocks that perform the respective processes.

Figure 5:
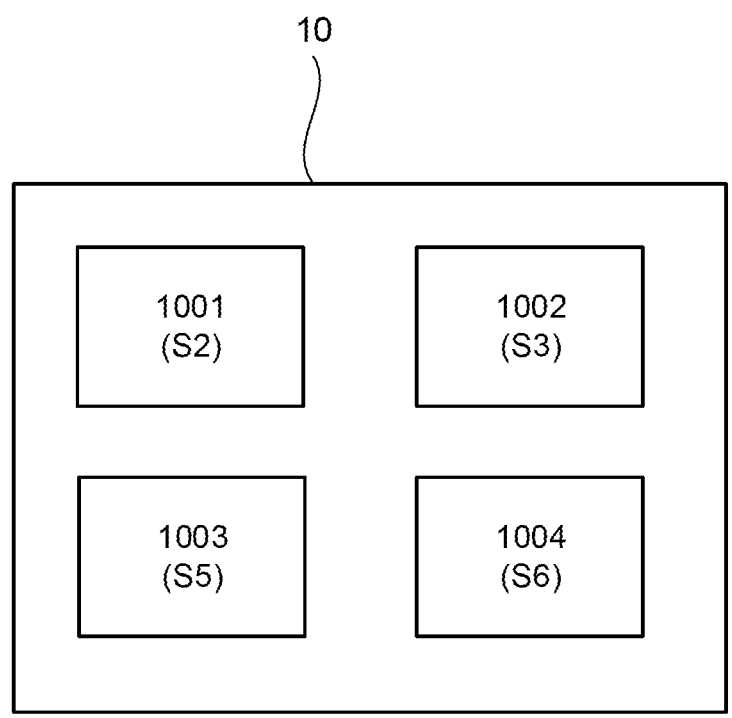
FIG. 5 is a diagram illustrating a detailed example of a controller.

For example, as illustrated in FIG. 5, the controller 10 includes: an abnormality determining unit 1001 that executes the abnormality determination step (S2); a rotational abnormality determination control unit 1002 that executes the rotational abnormality determination control step (S3); a hydraulic control unit 1003 that executes the hydraulic control step (S5); and a pump stop control unit 1004 that executes the pump stop control step (S6), and these control units may execute the respective control steps.

Moreover, the hydraulic control (S5) may be performed in accordance with some of the determination results in the clogging elimination control illustrated in FIG. 3. For example, even if only the abnormality determination step (S2) and the hydraulic control step (S5) are performed and the other processes are omitted, the clogging of the shift oil pump 122 can be eliminated.

The original pressure oil pump 101 is an example of a secondary oil pressure adjusting unit and the shift oil pump 122 is an example of an oil pump. In addition, because the line pressure adjusting valve 102 can control a line pressure similarly to the original pressure oil pump 101, the line pressure adjusting valve 102 can be regarded as a part of the secondary oil pressure adjusting unit. Moreover, in the present embodiment, the SEC pressure is raised by decreasing an amount by which the shifting circuit pressure SOL 106 decreases the line pressure. However, the present embodiment is not limited to the above. For example, the SEC pressure may be raised by raising the output of the original pressure oil pump 101. Moreover, the SEC pressure may be raised by raising a target pressure of the line pressure by the control of the line pressure adjusting valve 102.

Moreover, in the present embodiment, when the speed ratio is the smallest (Lowest) in Steps S4 and S7, the process proceeds to Step S5 in which the hydraulic control step is executed. However, the present embodiment is not limited to the above. A threshold in these determination processes only needs to be a predetermined speed ratio such that the decrease in the ride quality caused by the fluctuation of the driving force is suppressed even if it is not the Lowest. In this case, even if the hydraulic control step is executed, the clogging of the shift oil pump 122 can be eliminated without reducing ride quality.

According to the present embodiment, the following effects can be obtained.

According to the present embodiment, the abnormality determination step (S2) and the hydraulic control step (S5) are executed. The shift oil pump 122 causes abnormal rotation when a contamination included in oil is caught in a movable part. Therefore, in the abnormality determination step, when it is determined that the rotation of the shift oil pump 122 is abnormal (S2: Yes), the hydraulic control step (S5) is performed.

In the hydraulic control step, the oil pressure of the SEC pulley 42 is set to be higher than that before the determination of the abnormality by controlling the original pressure oil pump 101, the line pressure adjusting valve 102, and the like. Because oil is forced to flow into the shift oil pump 122 provided between the SEC pulley 42 and the PRI pulley 41 along with the rise of the SEC pressure, a contamination caught in the shift oil pump 122 is discharged. In this way, because a failure in the shift oil pump 122 is eliminated, it is possible to reduce a fear that shift cannot be performed due to the lock of the shift oil pump 122.

According to the present embodiment, the rotation stop determination step (S3) is executed, and when it is determined that the shift oil pump 122 is in a locked state where its rotation is stopped (S3: No), the pump stop control step (S6) is executed.

When the shift oil pump 122 is stopped and is locked, because a current continues flowing into the electric motor 123 in the locked state, it is not preferable because there is a danger of failure. Therefore, when the rotation of the shift oil pump 122 is stopped (S3: No), the shift oil pump 122 can be protected by executing the pump stop control step (S6).

According to the present embodiment, when the speed ratio is the lowest (S4: Yes, S7: Yes), the hydraulic control (S5) is performed. When the clogging of the shift oil pump 122 is eliminated and the free rotation can be performed by performing the hydraulic control, the value of the PRI pressure becomes the same as that of the SEC pressure. Herein, the cross-sectional area of the PRI pulley 41 is smaller than the cross-sectional area of the SEC pulley 42. For that reason, because the PRI thrust becomes smaller than the SEC thrust, there is a possibility that the piston of the PRI pulley 41 is pushed to the low side and unintentional shift down occurs. Therefore, when the speed ratio is the lowest (S4: Yes, S7: Yes), because unintentional shift down can be prevented by performing the hydraulic control (S5), it is possible to suppress the decrease in ride quality. Moreover, because the change of the speed ratio is hard to be transmitted to the driver if the speed ratio is in a low state even if the PRI pressure is raised, the decrease in ride quality can be suppressed.

According to the present embodiment, the deviation ΔN between the rotation speed of the shift oil pump 122 and the command value of the rotation speed for the electric motor 123 is calculated in the abnormality determination step (S2). Then, the determination of whether the absolute value of the deviation ΔN exceeds the allowable lower-limit rotation speed N min is performed. When the ΔN is smaller than the lower-limit rotation speed N min, it is determined that non-rotatable abnormality occurs in the shift oil pump 122 and the hydraulic control (S5) is performed. By doing like this, because the non-rotatable abnormality of the shift oil pump 122 can be appropriately determined, the hydraulic control for raising the SEC pressure is not performed and thus unnecessary energy loss can be reduced when abnormality does not occur, namely the clogging does not occur in the shift oil pump 122.

According to the present embodiment, in the continuously variable transmission, the orifice 125 as a discharge mechanism is provided between the shift oil pump 122 and the PRI pulley 41. Because the SEC pressure is raised when the original pressure oil pump 101 is driven at a higher pressure by the hydraulic control, oil is further delivered to the PRI pulley 41.

In order to maintain the speed ratio at a desired value, it is preferable that the inflow amount of oil exceeds the leak amount in the shift oil pump 122, the piston of the PRI pulley 41, etc. in the PRI circuit between the shift oil pump 122 and the PRI pulley 41. However, it is necessary to supply a sufficient flow rate of oil to the shift oil pump 122 in order to eliminate the clogging.

Herein, oil is leaked out from the orifice 125 in addition to the shift oil pump 122, the PRI pulley 41, etc. by providing a discharge mechanism such as the orifice 125. For that reason, even if a flow rate of oil more than the leak amount is supplied, the amount of oil in the PRI circuit is not considerably increased because oil is discharged from the orifice 125. Therefore, because a desired speed ratio is maintained, the shift that is not expected by the driver is not performed and thus the degradation of ride quality can be suppressed.

In the present embodiment, the cross-sectional area of the PRI pulley 41 is smaller than the cross-sectional area of the SEC pulley 42. Herein, when the shift oil pump 122 is stopped and is rotatable by the pump stop control (S6), the PRI oil pressure becomes equal to the SEC oil pressure. For that reason, a thrust in the PRI pulley 41 becomes smaller than a thrust in the SEC pulley 42 due to the difference between the sizes of the cross-sectional areas. For that reason, because the piston position of the PRI pulley 41 moves toward Low, the speed ratio transits to Lowest (S7: Yes) and then the hydraulic control (S5) can be performed. By doing like this, because the change of the speed ratio becomes hard to be transmitted to the driver, the degradation of ride quality can be suppressed.

As described above, the embodiment of the present invention has been explained, but the above embodiment is only a part of the application example of the present invention and the technical scope of the present invention is not intended to be limited to the specific configuration of the above embodiment.

The invention claimed is:

1. A method for controlling a continuously variable transmission, the method controlling in/out of oil to/from a primary oil chamber by using an oil pump provided in an oil passage between the primary oil chamber and a secondary oil chamber, the method comprising:
   an abnormality determination step of determining whether rotation of the oil pump is abnormal; and
   when it is determined that the rotation is abnormal in the abnormality determination step, a hydraulic control step of making a secondary oil pressure higher than a pressure before the determination of abnormality.

2. The method for controlling the continuously variable transmission according to claim 1, further comprising:
   a rotation stop determination step of determining whether the rotation of the oil pump is stopped; and
   when it is determined that the rotation of the oil pump is stopped in the rotation stop determination step, a stop control step of stopping control of the oil pump.

3. The method for controlling the continuously variable transmission according to claim 1, wherein the hydraulic control step is performed when it is determined that the rotation is abnormal in the abnormality determination step and when a speed ratio of the continuously variable transmission is lower than a predetermined value.

4. The method for controlling the continuously variable transmission according to claim 1, wherein the abnormality determination includes determining that the oil pump is abnormal when a difference between a rotation speed of the oil pump and a command value of the rotation speed for the oil pump is larger than an allowable upper limit.

5. A continuously variable transmission system comprising:
   a primary oil chamber;
   a secondary oil chamber;
   a secondary oil pressure adjusting unit configured to supply oil to the secondary oil chamber to control a secondary oil pressure;
   an oil pump provided in an oil passage between the primary oil chamber and the secondary oil chamber to control oil in/out to/from the primary oil chamber; and
   a controller configured to control the secondary oil pressure adjusting unit and the oil pump,
   the controller comprising:
      an abnormality determining unit that determines whether rotation of the oil pump is abnormal; and
      when it is determined that the rotation is abnormal by the abnormality determining unit, a secondary hydraulic control unit that controls the secondary oil pressure adjusting unit so that the secondary oil pressure is higher than a pressure before the determination of abnormality.

6. The continuously variable transmission system according to claim 5, further comprising an oil discharge mechanism configured to be able to discharge oil to the oil passage between the primary oil chamber and the oil pump.

7. The continuously variable transmission system according to claim 5, wherein a cross-sectional area of the primary oil chamber is smaller than a cross-sectional area of the secondary oil chamber.

* * * * *